US008224036B2

(12) United States Patent
Maruyama et al.

(10) Patent No.: US 8,224,036 B2
(45) Date of Patent: Jul. 17, 2012

(54) IMAGE EDITING APPARATUS, METHOD FOR CONTROLLING IMAGE EDITING APPARATUS, AND RECORDING MEDIUM STORING IMAGE EDITING PROGRAM

(75) Inventors: Atsushi Maruyama, Sagamihara (JP); Satoshi Miyazaki, Tokyo (JP); Masaomi Tomizawa, Hachioji (JP); Takeshi Suzuki, Akiruno (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 766 days.

(21) Appl. No.: 12/120,688

(22) Filed: May 15, 2008

(65) Prior Publication Data

US 2008/0292148 A1  Nov. 27, 2008

(30) Foreign Application Priority Data

May 24, 2007 (JP) ................................ 2007-138289

(51) Int. Cl.
*G06K 9/00* (2006.01)
*G06F 3/048* (2006.01)

(52) U.S. Cl. ......... 382/117; 382/118; 382/167; 715/715
(58) Field of Classification Search .................... 715/715
See application file for complete search history.

(56) References Cited

U.S. PATENT DOCUMENTS

| | | | | |
|---|---|---|---|---|
| 5,482,048 A | * | 1/1996 | Johnson | 600/476 |
| 5,943,049 A | * | 8/1999 | Matsubara et al. | 715/715 |
| 6,121,953 A | * | 9/2000 | Walker | 345/156 |
| 6,879,709 B2 | * | 4/2005 | Tian et al. | 382/118 |
| 7,660,479 B2 | * | 2/2010 | Matama | 382/257 |
| 2003/0068084 A1 | * | 4/2003 | Kinjo et al. | 382/164 |

FOREIGN PATENT DOCUMENTS

| | | |
|---|---|---|
| JP | 2001-91979 | 4/2001 |
| JP | 2005-222152 | 8/2005 |
| JP | 2006-72743 | 3/2006 |

OTHER PUBLICATIONS

First Notification of Office Action for Chinese Application No. 200810109034.9, mailed Jul. 14, 2010 (12 pgs.) with translation (10 pgs.).

* cited by examiner

*Primary Examiner* — Vu Le
*Assistant Examiner* — Ha Le
(74) *Attorney, Agent, or Firm* — John C. Pokotylo; Straub & Pokotylo

(57) ABSTRACT

An image editing apparatus includes an image input unit including an image pickup circuit which takes a picture of a subject to obtain an image of a subject. A face detection circuit detects an image of a face of the subject from the image obtained from the image input unit. A face expression detection circuit detects at least any one of direction and expression of the face of the subject, based on the image of the face detected by the face detection circuit. A pupil detection circuit detects images of pupils of the subject, based on the image of the face detected by the face detection circuit. A catch-light composition circuit composes different catch-lights on the images of the pupils detected by the pupil detection circuit, according to any one of the direction and expression of the face detected by the face expression detection circuit.

9 Claims, 11 Drawing Sheets

IMAGE EDITING APPARATUS, METHOD FOR CONTROLLING IMAGE EDITING APPARATUS, AND RECORDING MEDIUM STORING IMAGE EDITING PROGRAM

CROSS-REFERENCE TO RELATED APPLICATIONS

This application is based upon and claims the benefit of priority from prior Japanese Patent Application No. 2007-138289, filed May 24, 2007, the entire contents of which are incorporated herein by reference.

BACKGROUND OF THE INVENTION

1. Field of the Invention

The present invention relates to an image editing apparatus, a method for controlling the image editing apparatus, and a recording medium storing an image editing program, which compose catch-lights on an image of a subject on a face.

2. Description of the Related Art

In portrait shooting, there is a known technique to make a face stand out by inserting catch-lights on the eyes of a subject, a model for example. It is possible to emphasize or add to an expression on a subject's face by inserting such catch-lights. Generally, a human face has a variety of expressions, such as happy, angry, and worried. There are optimum catch-lights for each of these faces.

Light applied to a subject are reflected on the spherical surface of the corneas of the eyes of the subject, and the reflected light are exposed by an image pickup element, thereby catch-lights are produced. Jpn. Pat. Appln. KOKAI Publication No. 2001-91979 discloses a technique to produce such catch-lights by using a flash unit built into a camera as a light source. In Jpn. Pat. Appln. KOKAI Publication No. 2001-91979, a light source to illuminate a subject is a point light source, and color of light is white. Therefore, white circular catch-lights are produced on the pupils of a subject. Jpn. Pat. Appln. KOKAI Publication No. 2006-72743 discloses a technique to artificially produce catch-lights by image processing.

BRIEF SUMMARY OF THE INVENTION

According to a first aspect of the invention, there is provided an image editing apparatus comprising: an image input unit including an image pickup circuit which takes a picture of a subject to obtain an image of a subject; a face detection circuit which detects an image of a face of the subject from the image obtained from the image input unit; a face expression detection circuit which detects at least any one of direction and expression of the face of the subject, based on the image of the face detected by the face detection circuit; a pupil detection circuit which detects images of pupils of the subject, based on the image of the face detected by the face detection circuit; and a catch-light composition circuit which composes different catch-lights on the images of the pupils detected by the pupil detection circuit, according to any one of the direction and expression of the face detected by the face expression detection circuit.

According to a second aspect of the invention, there is provided a method of controlling an apparatus for editing an image obtained by taking a picture of a subject, comprising: detecting an image of a face of the subject from the obtained image; detecting at least any one of the direction and expression of the face of the subject, based on the detected image of the face; detecting images of the pupils of the subject, based on the detected image of the face; and composing different catch-lights on the detected images of the pupils, according to any one of the detected direction and expression of the face.

According to a third aspect of the invention, there is provided a method of controlling an apparatus for editing an image obtained by taking a picture of a subject, comprising: detecting an image of a face of the subject from the obtained image; detecting at least any one of the direction and expression of the face of the subject, based on the detected image of the face; detecting a direction of the eyes of the subject, based on the detected image of the face; detecting images of the pupils of the subject, based on the detected image of the face; and composing catch-lights on the detected images of the pupils, according to any one of the detected direction and expression of the face, and the direction of the eyes.

According to a fourth aspect of the invention, there is provided a computer readable recording medium recording a program for editing an image obtained by taking a picture of a subject, the program enabling the computer to perform the following: a function of detecting an image of a face of the subject from the obtained image; a function of detecting images of the pupils of the subject, based on the detected image of the face; and a function of composing different catch-lights on the detected images of the pupils, according to any one of the detected direction and expression of the face.

According to a fifth aspect of the invention, there is provided an image editing apparatus comprising: an image input unit including an image pickup circuit which takes a picture of a subject to obtain an image of a subject; a detection circuit which detects an image of a face of the subject from the image obtained from the image input unit; detects at least any one of direction and expression of the face of the subject, based on the detected image of the face; and detects images of the pupils of the subject, based on the detected image of the face; and a catch-light composition unit which composes different catch-lights on the detected images of the pupils, according to any one of the direction and expression of the detected face.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the invention will be explained with reference to the accompanying drawings.

Embodiment 1

Figure 1:
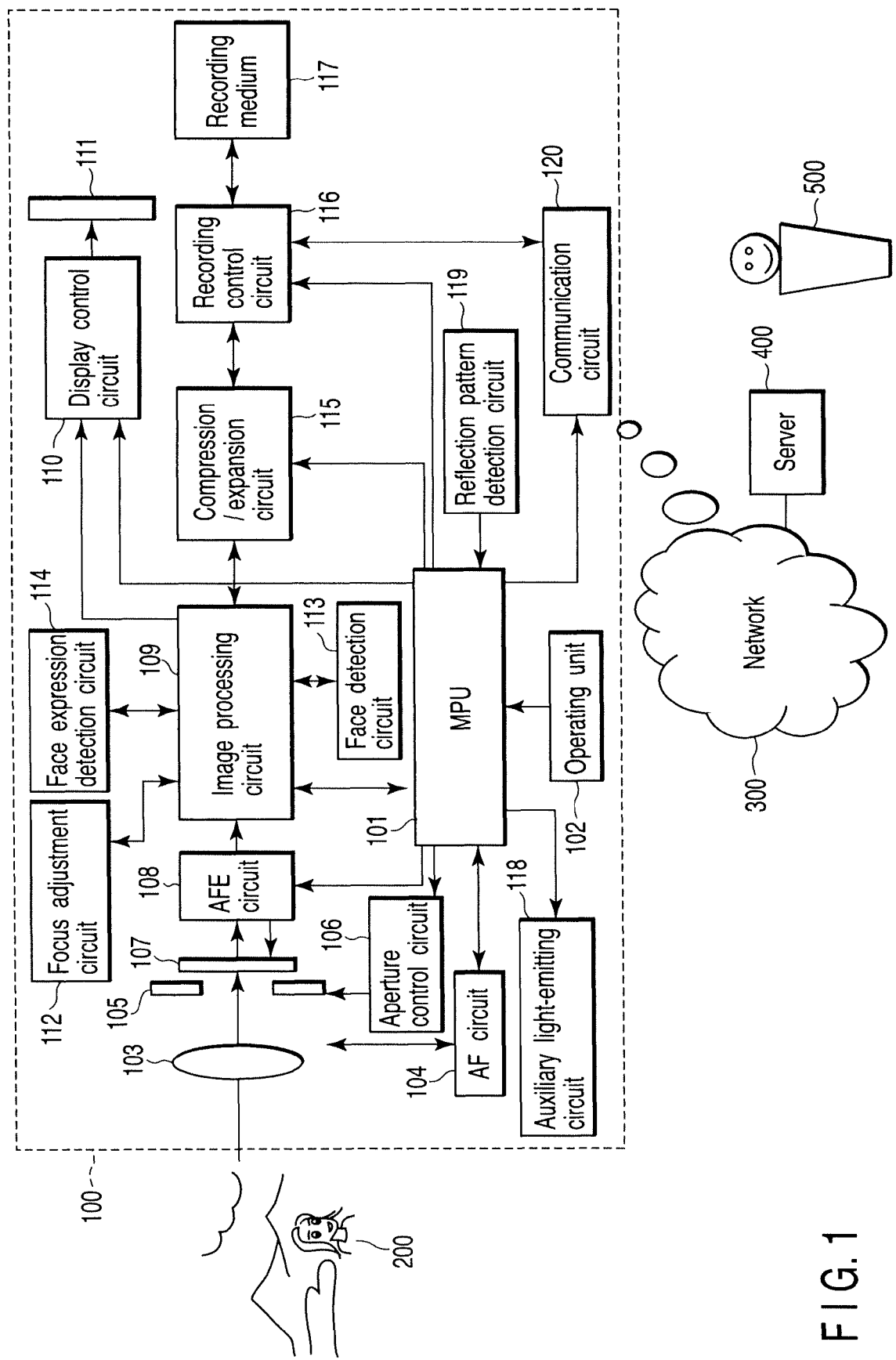
FIG. 1 is a block diagram showing the configuration of a digital camera as an example of an image editing apparatus according to a first embodiment of the invention.

FIG. 1 is a block diagram showing the configuration of a digital camera 100 as an example of an image editing apparatus according to a first embodiment of the invention. The digital camera 100 shown in FIG. 1 has a microprocessor unit (MPU) 101, an operating unit 102, a camera lens 103, an autofocus (AF) circuit 104, an aperture mechanism 105, an aperture control circuit 106, an image pickup element 107, an analog front end (AFE) circuit 108, an image processing circuit 109, a display control circuit 110, a display panel 111, a focus judgment circuit 112, a face detection circuit 113, a face expression detection circuit 114, a compression/expansion circuit 115, a recording control circuit 116, a recording medium 117, an auxiliary light-emitting circuit 118, a reflection pattern detection circuit 119, and a communication circuit 120. The digital camera 100 is connected communicatively to a server 400 through a network 300.

The MPU 101 sequentially controls each block composing the digital camera 100 according to the operation of the operating unit 102 by the user. The operating unit 102 includes a release switch to execute photo shooting with the digital camera 100, and a mode change switch to change the operation mode of the digital camera 100 between a shoot mode and play mode.

The MPU 101 has a timer for recording the time/date of a photo taken by the user. The timer can associate the time/date of photo shooting with the image data obtained by the photo shooting.

The camera lens 103 forms an image of a subject 200 in the image pickup element 107. The camera lens 103 includes a focus lens for auto focusing. In autofocus mode, the MPU 101 monitors the position of the focus lens, and changes the position of the focus lens by controlling the AF circuit 104, thereby adjusting the focus of the camera lens 103. The aperture mechanism 105 is provided in or near the camera lens 103, and functions as a shutter and aperture. The aperture mechanism 105 is opened to a predetermined aperture at the beginning of photo shooting, and closed at the end of photo shooting.

The image pickup element 107 having the function as an image pickup unit has a light-receiving plane composed of an array with a large number of pixels. The image pickup element 107 converts an image of the subject 200 received through the camera lens 103 into an electric signal. In this embodiment, the image pickup element 107 may use either a CCD or CMOS system.

The AFE circuit 108 includes a CDS circuit, a gain adjustment circuit, and an AD conversion circuit. The AFE circuit 108 performs analog processing, such as correlation double sampling and gain adjustment, on an analog electric signal obtained by the image pickup element 107. The AFE circuit 108 converts the image signal obtained by the analog processing to digital data, and inputs it to the image processing circuit 109. The AFE circuit 108 is provided with a function of collectively reading signals from the pixels composing the image pickup element 107. For example, it is possible to improve the S/N ratio by collectively reading signals of 4 pixels (2×2 pixels) or 9 pixels (3×3 pixels) by the AFE circuit 108, and adding these electric signals. The apparent sensitivity of the image pickup element 107 can be increased by such processing.

Further, the AFE circuit 108 has a function of selecting output signals from the image pickup element 107. Therefore, it is possible to extract solely a signal from a limited range pixel among all effective pixels of the image pickup element 107. Generally, the image pickup element 107 can read a signal at a high speed by thinning out. By displaying a through image for confirming a frame obtained by continuously operating the image pickup element 107 on the display panel 111 by using this function, after processing the image in the image processing circuit 109, the user can frame the image by using the through image displayed on the display panel 111.

The image processing circuit 109 performs various types of image processing: correcting the color, gradation and sharpness of image data input from the AFE circuit 108, amplifying the image data level to a predetermined level, and adjusting the image data to a correct density and gray level.

To display various images such as an image for framing as described above, the image processing circuit 109 has a function for resizing (reducing) the image data input from the AFE circuit 108 to be displayable on the display panel 111.

Further, in this embodiment, when catch-lights in the eyes of the subject 200 are detected, the image processing circuit 109 eliminates the catch-lights. The image processing circuit 109 has a function as a catch-light composing circuit to compose catch-lights corresponding to a face impression of the subject 200, which is used in place of the eliminated catch-lights.

The display control circuit 110 converts the image data obtained in the image processing circuit 109 or the image data recorded in the recording medium 117 into a video signal, and displays the image on the display panel 111 based on the converted video signal. The display panel 111 is a liquid crystal panel or an organic EL display panel. A list of images sent (uploaded) to the server 400 may be displayed on the display panel 111. The user or photographer can select an image to be used for a blog service managed by the server 400, from the list of the uploaded images to the server 400, by operating the operating unit 102. It is permitted to select a layout for displaying an image on a blog.

The focus judgment circuit 112 detects the contrast of an image obtained by the image processing circuit 109. The contrast detected by the focus judgment circuit 112 is used for auto focusing. In autofocus mode, the focus judgment circuit 112 sequentially detects the contrast of an image, while the AF circuit 104 changes the position of the focus lens of the camera lens 103. As the focus of the camera lens 103 can be adjusted, the focus lens is stopped when the detected contrast is at maximum.

The face detection circuit 113 detects a part, particularly corresponding to a face of the subject, according to the distribution of characteristic points (e.g., eyes, nose and mouth, when a subject is a person) of the image obtained by the image processing circuit 109. The face expression detection circuit 114 calculates the value R based on the image of a face detected by the face detection circuit 113 (to be explained in detail later). The value R is a value for obtaining a face expression of a subject.

The compression/expansion circuit 115 compresses the image processed by the image processing circuit 109 at the time of photo shooting. The compression/expansion circuit 115 has a still image compression unit having a known still image compressing function, such as JPEG, and a dynamic image compression unit having a known dynamic image compressing function, such as MPEG or H.264. The compression/expansion circuit 115 also has a function of expanding compressed still or dynamic image data. The recording control circuit 116 records the image data compressed by the compression/expansion circuit 115 together with accompanying data, in the recording medium 117.

The auxiliary light-emitting circuit 118 emits light to the subject 200 according to photo shooting conditions. This prevents insufficient or uneven brightness at the time of photo shooting. The reflection pattern detection circuit 119 having the function as a pupil detection circuit detects a pattern of the light reflected from the eyes of the subject 200 using the lighting of the auxiliary light-emitting circuit 118.

The communication circuit 120 controls the communication when the image data recorded in the recording medium 117 or obtained by photo shooting is sent to the server 400 through the network 300. The communication circuit 120 also controls the communication when receiving various data from the server 400. The communication circuit 120 is a wireless LAN interface circuit, for example. The image sent to the server 400 can be immediately shown to a user 500 as an image displayed in a blog managed by the server 400.

Figure 2A:
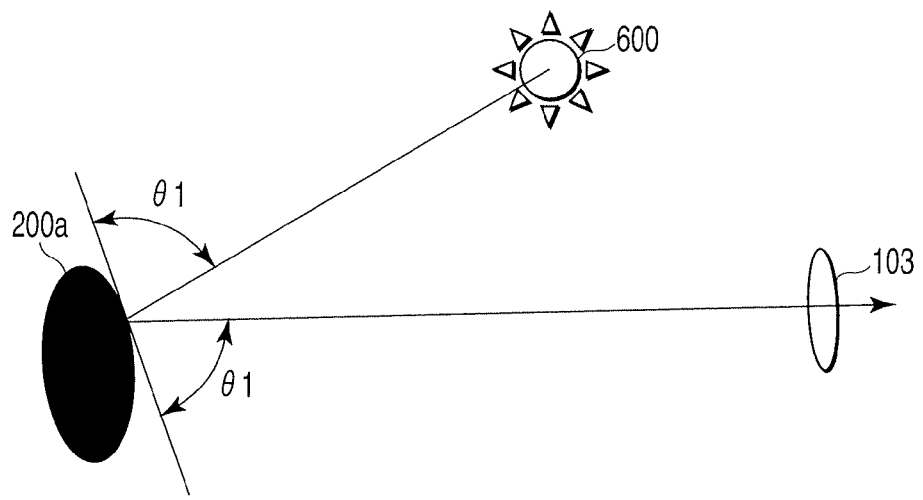
FIGS. 2A, 2B and 2C are views showing the relation between the position of a light source and the direction of light reflected from a pupil.
Figure 2B:
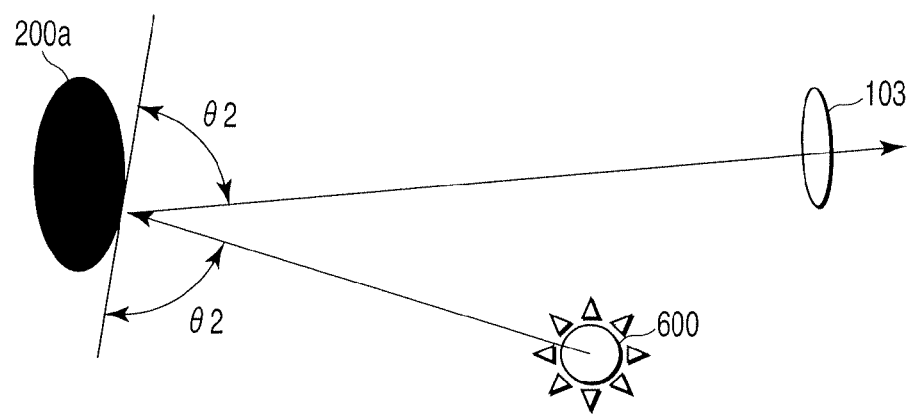
Figure 2C:
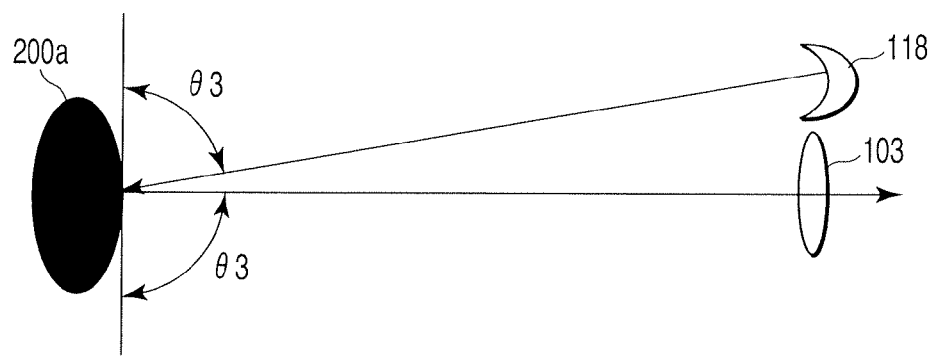
Figure 3A:
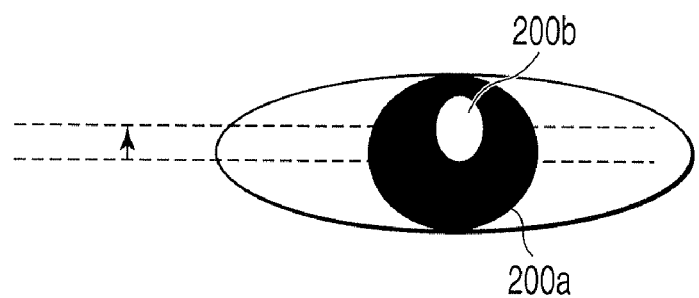
FIGS. 3A, 3B and 3C are views showing the relation between light reflected from a pupil and a catch-light in a pupil.
Figure 3B:
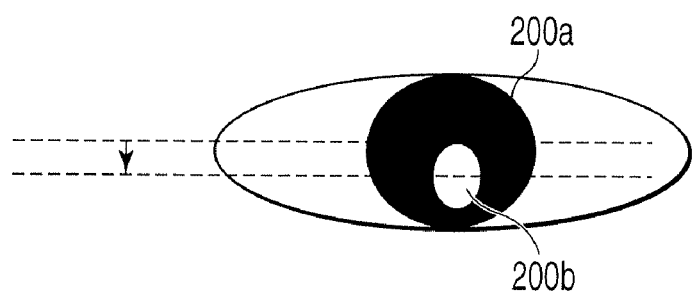
Figure 3C:
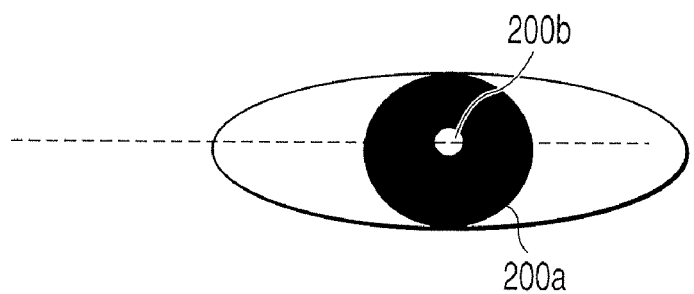

Hereinafter, an explanation will be given on the operation of the digital camera 100 in the first embodiment. First, a catch-light will be explained with reference to FIGS. 2A-2C and FIGS. 3A-3C. FIGS. 2A-2C are views showing the relation between the position of a light source and the direction of a reflected light from a pupil. FIGS. 3A-3C are views showing the relation between a reflected light from a pupil and a catch-light reflected from a pupil.

FIG. 2A shows an example in which the light source 600 illuminates the subject 200 from a higher position. It is assumed that the incident light from the light source 600 is applied to the upper part of a pupil 200a of the subject 200 at an angle of θ1. In this case, the reflected light is also applied to the camera lens 103 at angle of θ1 to the pupil 200a. Therefore, as shown in FIG. 3A, a catch-light 200b appears in the upper part of the pupil 200a. FIG. 2B shows an example in which the light from the light source 600 is reflected by using a reflector, and the subject 200 is illuminated from a lower position. It is assumed that the incident light from the light source 600 is applied to the lower part of a pupil 200a of the subject 200 at angle of θ2. In this case, the reflected light is also applied to the camera lens 103 at an angle of θ2 to the pupil 200a. Therefore, a catch-light 200b appears in the lower part of the pupil 200a. When there is no light source, a catch-light is of course not produced.

As described above, various catch-lights are produced depending on the state of a light source upon photo shooting. By changing such catch-lights, the atmosphere, such as face expressions and emotions of a subject upon photo shooting can be created. This is why catch-lights are much used by photographers, since it gives expressions to their photographs. However, a light source preferable for producing catch-lights is not always available. In such a case, a technique to produce catch-lights by using a flash unit (the auxiliary light-emitting circuit 118) usually built into a camera has been disclosed. This technique, however does not enable changing the position of a light source as shown in FIG. 2A or 2B, when the auxiliary light-emitting circuit 118 is used. Therefore, when the auxiliary light-emitting circuit 118 is used, the incident light from the auxiliary light-emitting circuit 118 always enters the pupil 200a of the subject 200 at an angle of θ3, and reflected light always enters the camera lens 103 at an angle of θ3, as shown in FIG. 2C. The auxiliary light-emitting circuit 118 is relatively small as a light source, and a white catch-light 200b appears in the central narrow range of the pupil 200a (or, the pupil appears red due to the so-called red-eye phenomenon). As a result, the expression becomes dull.

In this embodiment, catch-lights suitable for a face expression of a subject can be obtained by a simple operation, which makes various expressions possible in photo shooting.

Figure 4:
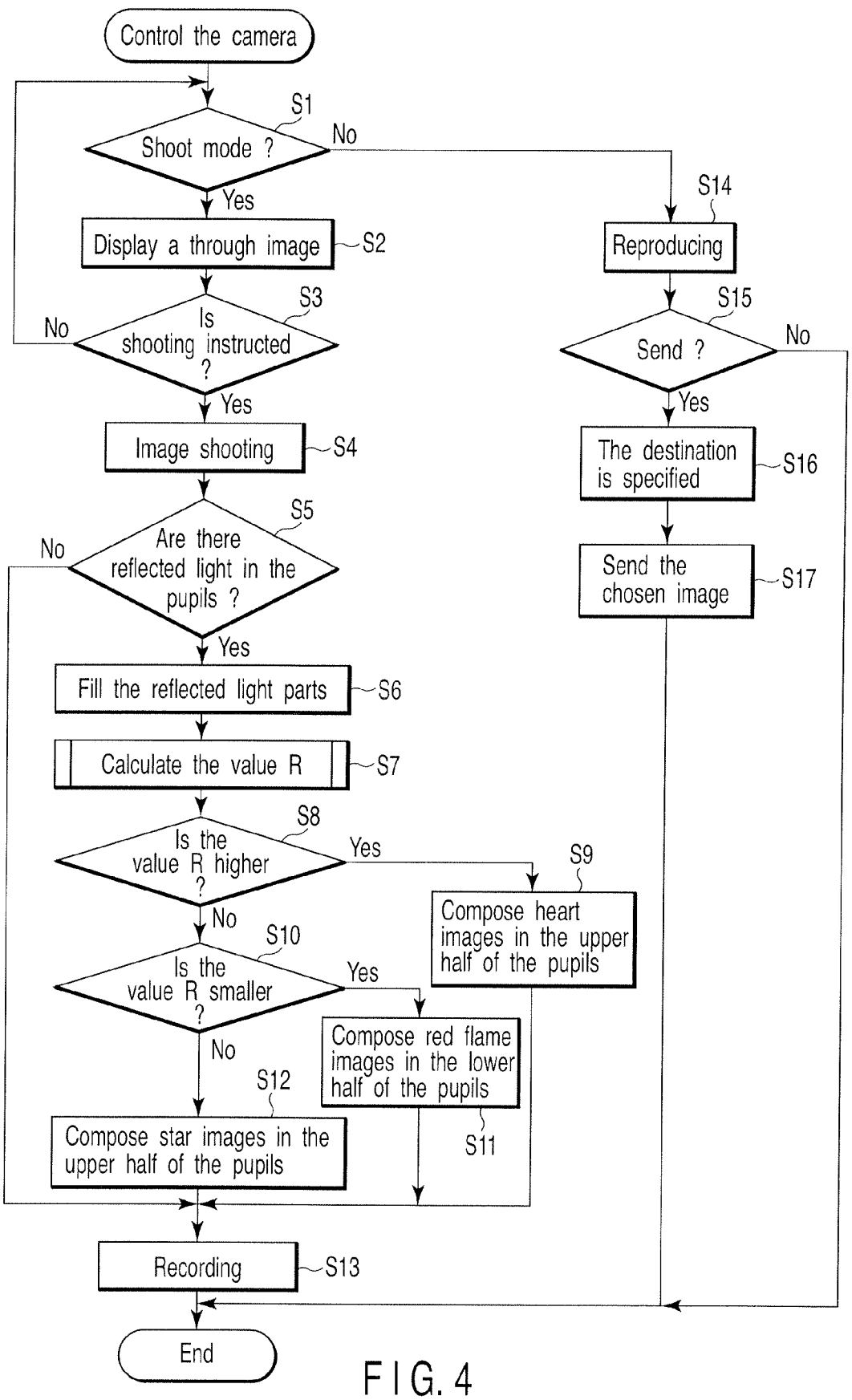
FIG. 4 is a flowchart showing the operation of the digital camera according to the first embodiment of the invention.

FIG. 4 is a flowchart showing the operation of the digital camera 100 according to the first embodiment of the invention.

In FIG. 4, the MPU 101 judges that the operation mode of the digital camera 100 is shoot mode (step 1). In the judgment in step S1, when the operation mode is shoot mode, the MPU 101 executes various controls for displaying a through image for framing on the display panel 111 (step S2). Namely, the MPU 101 sequentially obtains through image data by continuously operating the image pickup element 107, and processes the obtained through image data in the image processing circuit 109. Then, the MPU 101 displays a through image on the display panel 111 based on the through image data. After displaying a through image, the MPU 101 judges whether the photographer instructs photo shooting via operating the operating unit 102 (step S3). When photo shooting is not instructed in the judgment in step S3, step S1 takes place again. In contrast, when photo shooting is instructed in step S3, the MPU 101 executes photo shooting (step S4). Namely, the MPU 101 adjusts the focus of the camera lens 103, adjusts the aperture mechanism 105 to a predetermined aperture, executes photo shooting with the image pickup element 107, and obtains image data.

Then, the MPU 101 judges whether reflected light of auxiliary light are detected in the pupils of the subject 200 by the reflection pattern detection circuit 119, or whether catch-light are detected, from the image data obtained through the image pickup element 107 (step S5).

Figure 5:
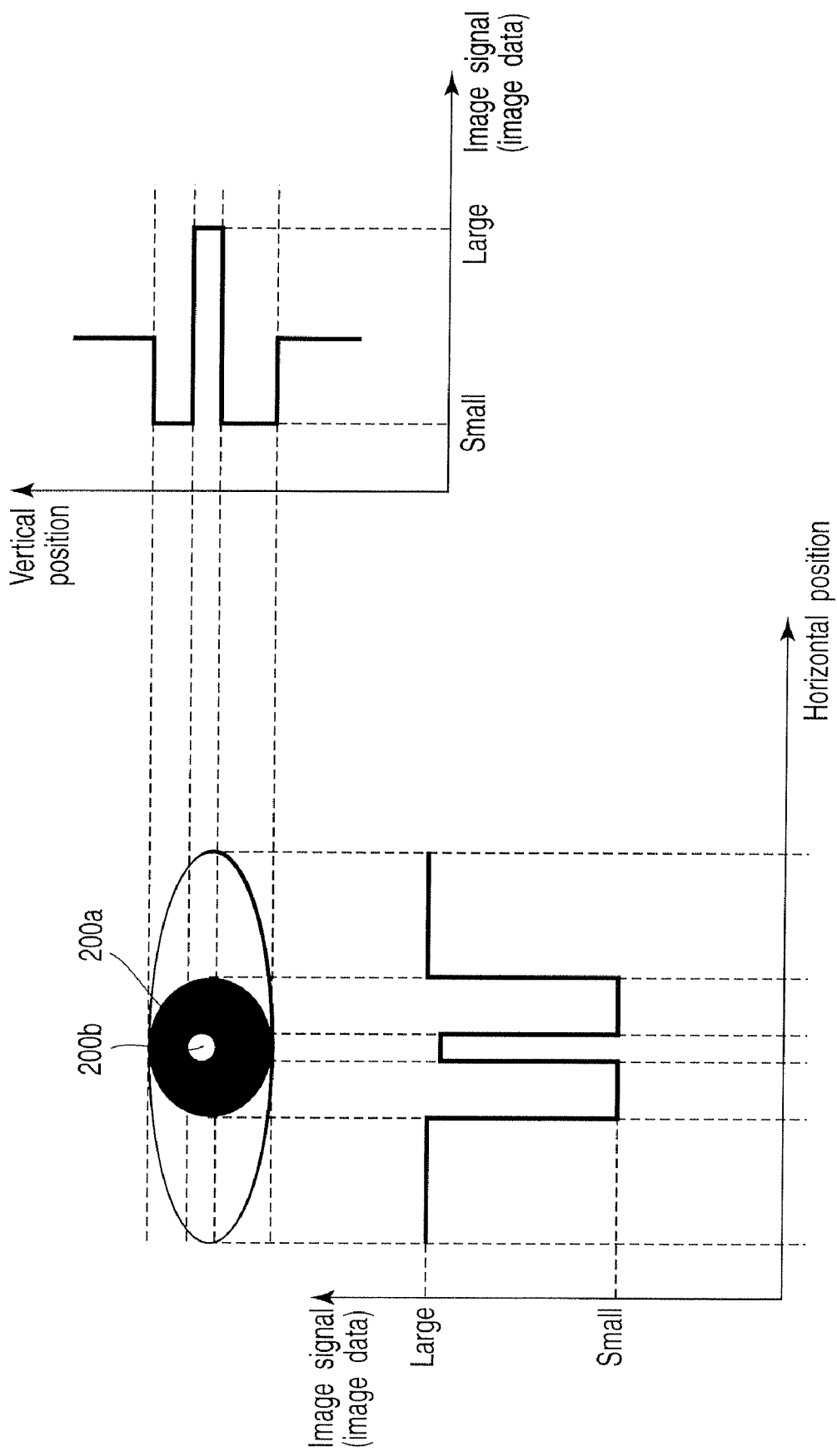
FIG. 5 is diagram showing the distribution of image data of an eye of a subject, when a picture is taken by activating an auxiliary light-emitting circuit.

Next, an explanation will be given on an example of the judging method in step S5. FIG. 5 is a view showing the distribution of image data in the eye of the subject 200, when photo shooting is performed by using the auxiliary light-emitting circuit 118. As shown in FIG. 3C, when the auxiliary light is emitted from the auxiliary light-emitting circuit 118, the reflected light (a catch-light) of the auxiliary light appears close to the center of the pupil. Therefore, the pattern of the image data close to the pupil of the subject 200 is large (white)—small (pupil)—large (reflected light)—small (pupil)—large (white) in the horizontal direction, and small (pupil)—large (reflected light)—small (pupil) in the vertical direction. By judging the pattern of the image data close to the pupil of the subject 200 as above, it is possible to judge whether any reflected light from the auxiliary light-emitting circuit 118 exists in the pupil. Since the pupil may be displaced to the right or left, it is preferable to detect the positions of the pupils when a through image is displayed before photo shooting. The pupil position can be detected by detecting the face part in the through image data obtained through the image pickup element 107 before photo shooting by the face detection circuit 113, detecting the eye part of the face part from the distribution of the shade in the face part by the face expression detection circuit 114, and detecting the parts showing low brightness in the image data of the eye part as pupil.

When reflected light are detected in the judgment of step S5, the MPU 101 fills the image data corresponding to the detected reflected light parts by the image processing circuit 109, by replacing the image data with the surrounding image data (pupils) (step S6). Then, the MPU 101 calculates the value R by using the face expression detection circuit 114, to detect the face expression of the subject 200 in the image (step S7).

Figure 6:
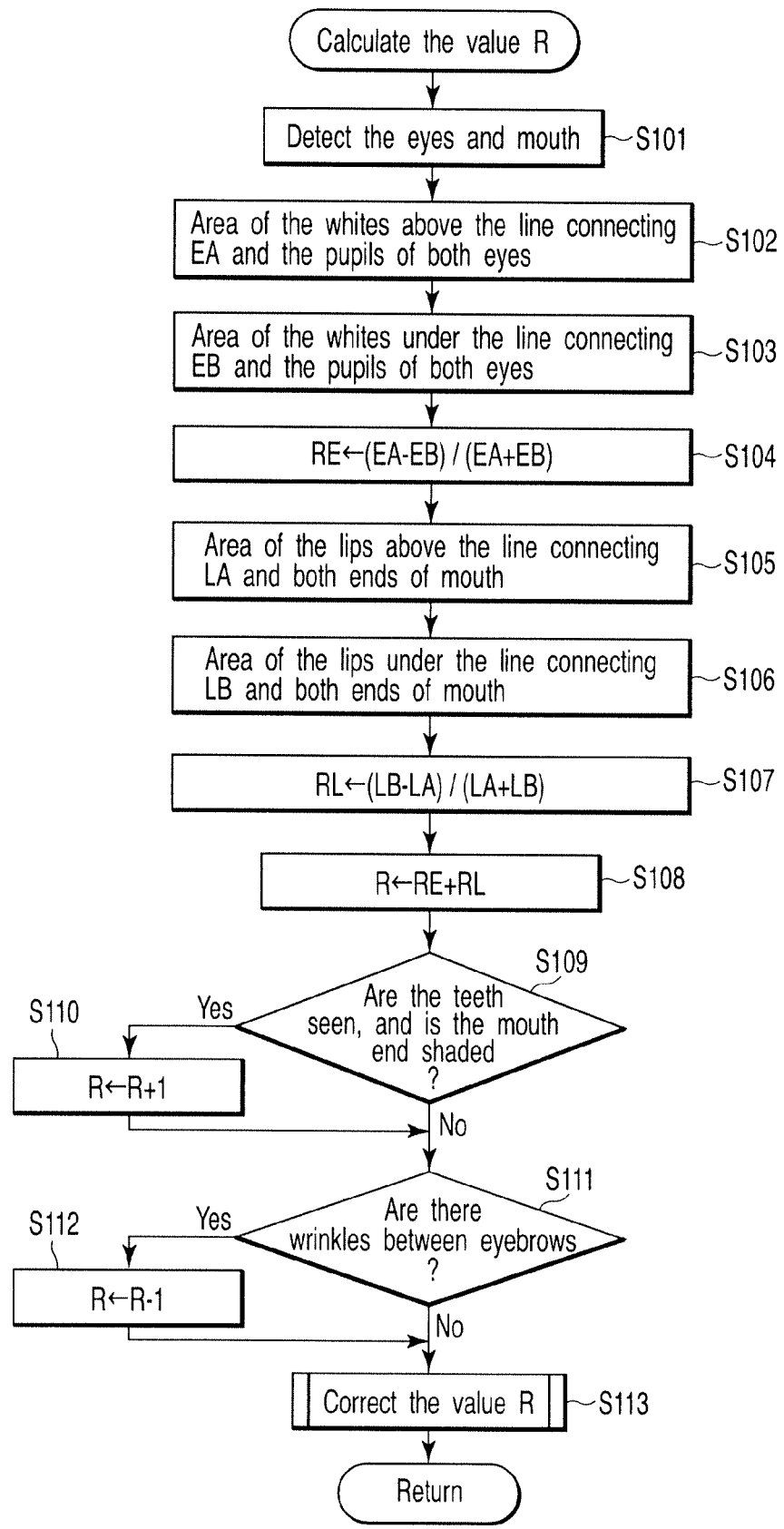
FIG. 6 is a flowchart showing the flow of processing for calculating a value R.

Next, the value R will be explained. FIG. 6 is a flowchart showing the flow of processing when the value R is calculated. In FIG. 6, first, the face expression detection circuit 114 detects the eyes and mouth according to the distribution of shades in the image of a face detected by the face detection circuit 113 (step S101). Concretely, the face detection circuit 113 detects a substantially circular face part in a contrast-enhanced image. Then, the face expression detection circuit 114 detects the eyes and mouth according to the distribution of the shades in the face. When the face is detected at the time of displaying a through image, step S101 can be omitted.

Figure 7A:
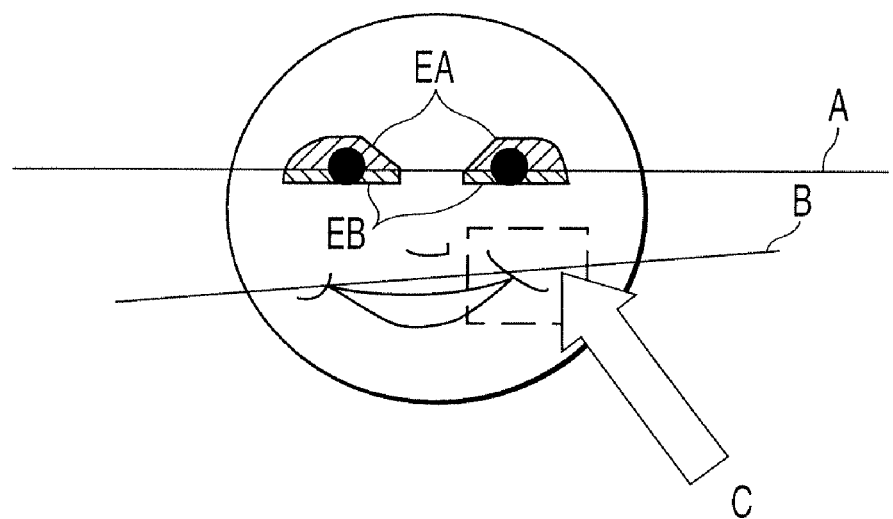
FIG. 7A is a view showing an example of an expression with a high R-value.
Figure 7B:
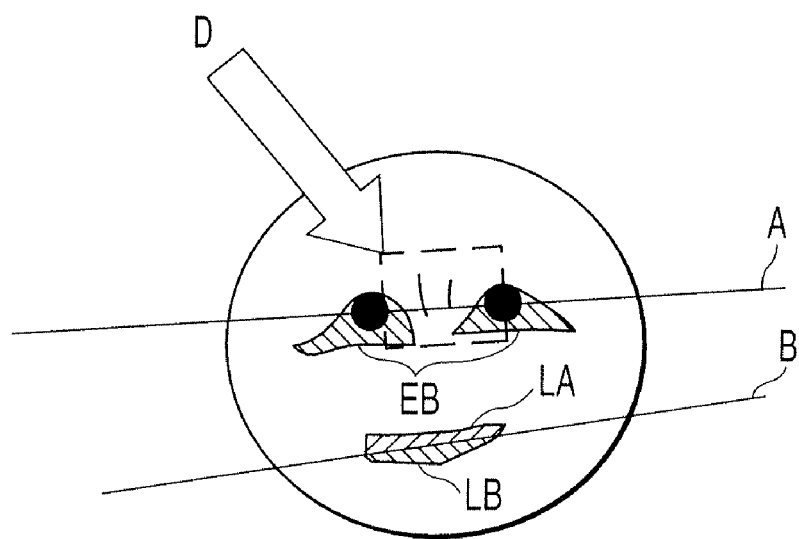
FIG. 7B is a view showing an example of an expression with a low R-value.

After detecting the eyes and mouth in step S101, the face expression detection circuit 114 calculates the area EA of the whites of the eyes above the straight line A connecting the pupils of both eyes (refer to FIG. 7A) (step S102). Then, the face expression detection circuit 114 calculates the area EB of the whites of the eyes under the straight line A connecting the pupils of both eyes (refer to FIG. 7A) (step S103). After calculating EA and EB, the face expression detection circuit 114 calculates the value RE that is obtained by normalizing the difference between EA and EB by the sum of EA and EB (step S104). Here, when the subject 200 wishes to display a smiling face to others, EB becomes close to 0 as shown in FIG. 7A, and RE becomes large as a result. In contrast, when the face of the subject is not a smiling face, but a worried face, for example, EA becomes close to 0 as shown in FIG. 7B, and RE becomes small as a result. Therefore, it is possible to judge the face expression from the size of RE.

After obtaining RE, the face expression detection circuit 114 calculates the area LA of the lips above the straight line B connecting both ends of the mouth (refer to FIG. 7B) (step S105). Then, the face expression detection circuit 114 calculates the area LB of the lips under the straight line B connecting both ends of the mouth (refer to FIG. 7B) (step S106). After calculating LA and LB, the face expression detection circuit 114 calculates the value RE that is obtained by normalizing the difference between LB and LA by the sum of LA and LB (step S107). Here, when the subject has a smiling face, LA becomes close to 0 as shown in FIG. 7A, and RL becomes large as a result. In contrast, when the subject has a worried face, LB becomes close to 0 as shown in FIG. 7B, and RL becomes small as a result. Therefore, it is possible to judge the face expression from the size of RL.

After calculating RE and RL, the face expression circuit 114 calculates the sum R of RE and RL (step S108). As the value R is larger, the face is closer to a smiling face. Further, if the end of the mouth is shaded as indicated by the arrow C in FIG. 7A or the teeth are seen, the face is probably a smiling face. Therefore, the face expression detection circuit 114 judges whether the teeth (white part) are seen in the mouth and the end of the mouth is shaded (step S109). When the teeth are seen in the mouth and the end of the mouth is shaded in the judgment of step S109, the face expression detection circuit 114 adds a predetermined value (here, 1) to R (step S110).

In contrast, when the teeth are seen in the mouth and the end of the mouth is not shaded in the judgment of step S109, or after step S110, the face expression detection circuit 114 judges whether wrinkles appear between eyebrows as indicated by the arrow D in FIG. 7B (step S111). When wrinkles are detected between the eyebrows in the judgment of step S111, the face expression detection circuit 114 subtracts a predetermined value (here, 1) from R (step S112). Namely, a face with wrinkles between eyebrows is not a smiling face, and the judgment of step S111 is executed.

In the processing of FIG. 6, when the face of the subject 200 is directed to the front, judgment of the face expression is easy. However, when the face of the subject 200 is directed upward or downward, judgment of the face expression is difficult. Therefore, the MPU 101 corrects the value R as follows (step S113).

Figure 8:
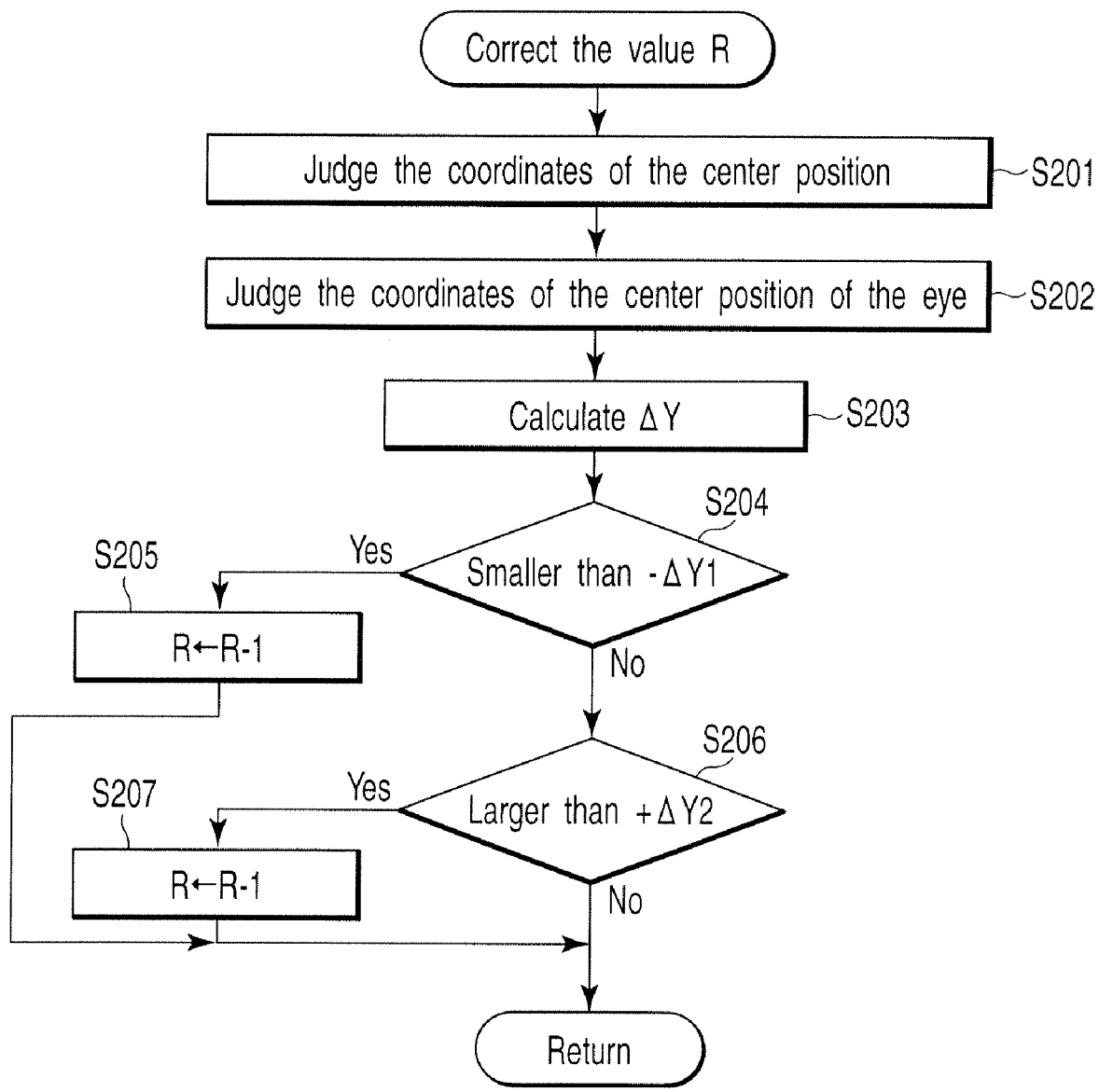
FIG. 8 is a flowchart showing the flow of correcting a value R.

FIG. 8 is a flowchart showing the flow of the R-value correction. In FIG. 8, first, the face expression detection circuit 114 detects the coordinates of the center position E in the face image detected by the face detection circuit 113 (refer to FIG. 9A) (step S201). Then, the face expression detection circuit 114 detects the coordinates of the center position F of the eyes in the face image detected by the face detection circuit 113 (refer to FIG. 9A) (step S202).

Figure 9A:
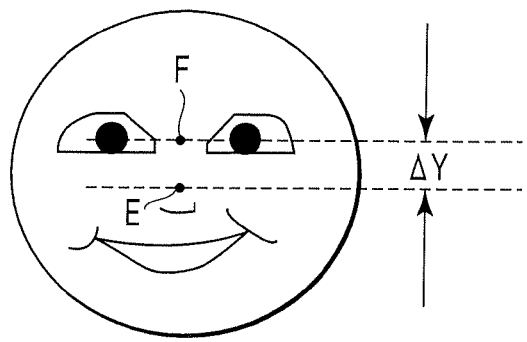
FIG. 9A is a view showing an example of an expression when the direction of a face is front.
Figure 9B:
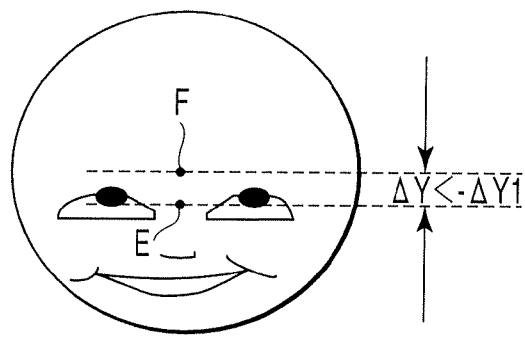
FIG. 9B is a view showing an example of an expression when the direction of a face is downward.
Figure 9C:
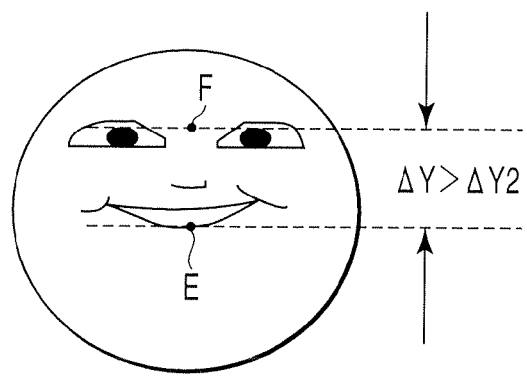
FIG. 9C is a view showing an example of an expression when the direction of a face is upward.

When the face is directed to the front, the center position F of the eyes is placed above the center position E of the face as shown in FIG. 9A. In contrast, when the face is directed downward, the center position F of the eyes is placed under the center position E of the face as shown in FIG. 9B. If the subject looks at the camera lens 103 in this state, the face of the subject has upturned eyes. Such a face hardly looks happy. When the face is directed upward, the center position F of the eyes is placed more above the center position E of the face than in the case of FIG. 9A, as shown in FIG. 9C. If the subject looks at the camera lens 103 in this state, the face of the subject seems to looking down. Such a face also hardly looks happy.

Therefore, in the processing of FIG. 8, the difference $\Delta Y$ between the face center position E and the eye center position F is calculated, and whether the face of the subject 200 is directed to the front, downward or upward is judged based on the value of $\Delta Y$.

Namely, after detecting the coordinates of the face center position E and eye center position F, the face expression detection circuit 114 calculates the difference $\Delta Y$ between the face center position E and eye center position F (step 203). Then, the face expression detection circuit 114 judges whether the difference $\Delta Y$ is smaller than a predetermined value, $-\Delta Y1$ (step S204). When the difference $\Delta Y$ is judged smaller than $-\Delta Y1$ in step S204, the face is judged to be directed downward as shown in FIG. 9B, and the face expression detection circuit 114 subtracts a predetermined value (here, 1) from the value R (step S205), and then quits the processing of FIG. 8.

In contrast, when the difference $\Delta Y$ is judged larger than $-\Delta Y1$ in step S204, the face expression detection circuit 114 judges whether the difference $\Delta Y$ is larger than a predetermined value, $\Delta Y2$ (step S206). When the difference $\Delta Y$ is judged larger than $\Delta Y2$ in step S206, the face is judged to be directed upward as shown in FIG. 9C, and the face expression detection circuit 114 subtracts a predetermined value (here, 1) from the value R (step S207), and then quits the processing of FIG. 8.

When the difference ΔY is judged smaller than ΔY2 in step S206, the face is judged to be directed to the front as shown in FIG. 9A, and the face expression detection circuit 114 does not correct the value R. In this case, the face expression detection circuit immediately quits the processing of FIG. 8.

Now, returning to FIG. 5, and the explanation will be continued. After calculating the value R in step S7, the face expression detection circuit performs catch-light processing, i.e., composing catch-light images suitable for the face expression of the subject 200 with the image data obtained through the image pickup element 107. FIGS. 10A to 10F show views showing examples of various catch-light images composed on the image of the pupil.

Figure 10C:
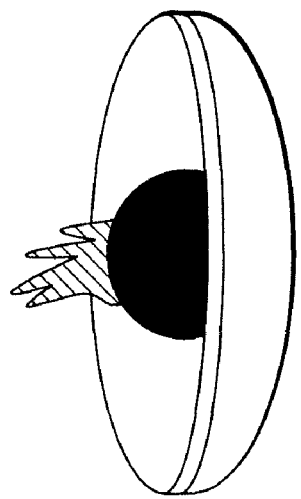
FIGS. 10A, 10B, 10C, 10D, 10E and 10F are views showing examples of various catch-light expressions on the image of a pupil.
Figure 10B:
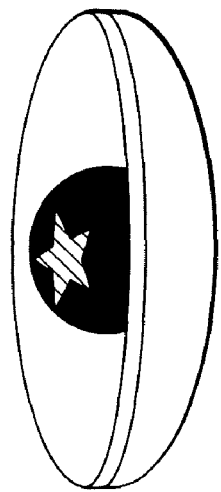
Figure 10A:
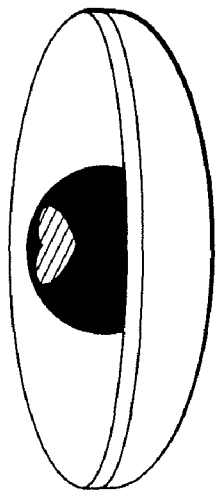

FIGS. 10A, 10B and 10C show an eye of the subject 200 in the fully opened state (the value R is high). In this case, the upper part of the pupil can be effectively used, and it is preferable to compose a catch-light image in the upper part of the pupil. When the value R is high, the face shows happiness or surprise. Therefore, it is recommended to use a heart or star as a catch-light image, as shown in FIG. 10A and FIG. 10B. The color may be white as in the case of an ordinary catch-light, but is preferably different for each catch-light image, for example, pink for a heart and yellow for a star.

Figure 10F:
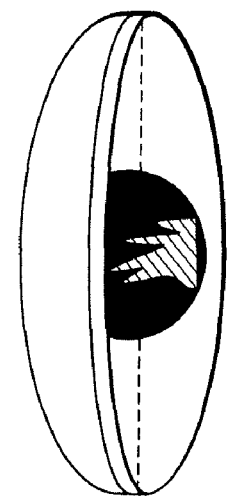
Figure 10E:
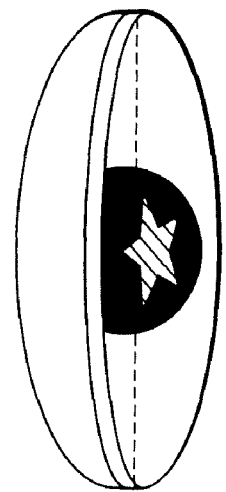
Figure 10D:
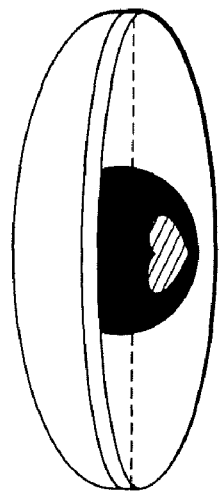

FIGS. 10D, 10E and 10F show an eye of the subject 200 in the staring state (the value R is low). In this case, the lower part of the pupil can be effectively used, and it is preferable to compose a catch-light image in the lower part of the pupil. When the value R is low, the face looks worried or staring, as described before. Therefore, it is recommended to use a flame as a catch-light image, as shown in FIG. 10F. The color may be white as in the case of an ordinary catch-light, but is preferably red for a flame, for example.

In the processing in and after step S8 of FIG. 5, catch-lights are composed based on the concept described above. First, the MPU 101 judges whether the value R obtained in step S7 is higher than a first predetermined value (step S8). When the value R is judged higher than the first predetermined value in step S8, the MPU 101 composes pink heart-shaped catch-light images in the upper half parts of the pupils in the image data obtained through the image pickup element 107, as shown in FIG. 10A, by using the image processing circuit 109 (step S9). When the value R is judged smaller than the first predetermined value in step S8, the MPU 101 judges whether the value R1 obtained in step S7 is smaller than a second predetermined value that is smaller than the first predetermined value (step S10). When the value R is judged smaller than the second predetermined value in step S10, the MPU 101 composes red flame-shaped catch-light images in the lower half parts of the pupils in the image data obtained through the image pickup element 107, as shown in FIG. 10F, by using the image processing circuit 109 (step S11). When the value R is judged higher than the second predetermined value in step S10, the MPU 101 composes yellow star-shaped catch-light images in the upper half parts of the pupils in the image data obtained through the image pickup element 107, as shown in FIG. 10C, by using the image processing circuit 109 (step S12).

After composing catch-light images in step S9, S11 or S12, the MPU 101 records the image data with composed catch-light images in the recording medium 117 (step S13), and finishes the processing of FIG. 4.

When shoot mode is not detected in the judgment of step S, the MPU 101 judges the mode as play mode, and waits for a choice of image to be made by the photographer. When an image is chosen, the MPU 101 reads the image data corresponding to the chosen image from the recording medium 117, and reproduces such image on the display panel 111 (step S14). Then, the MPU 101 judges whether the photographer operates to send the chosen image data (step S15). When the photographer does not operate to send the chosen image data in step S15, the MPU 101 finishes the processing of FIG. 4. In contrast, when the photographer operates to send the image data in step S15, the MPU 101 waits for input of the destination of the image data by the photographer (step S16). When the destination of the image is input, the MPU 101 sends the image data being played at that time to the destination specified in step S16, by using the communication circuit 120 (step S17), and finishes the processing of FIG. 4.

As explained above, according to the first embodiment, when catch-lights exist in the pupils of the subject 200 upon photo shooting, that catch-light portions are eliminated, and catch-light images having the shapes and colors determined according to the face expression are composed at positions in the pupils determined according to the face expression of the subject upon photo shooting. Therefore, the photographer can obtain a portrait image with effective catch-lights simply by shooting by lighting the auxiliary light-emitting circuit 118, without having to make specific settings to obtain a catch light effect.

Embodiment 2

A second embodiment of the invention will be explained. The second embodiment is used for confirming an image with composed catch-lights, when a through image is displayed before photo shooting. The configuration of the digital camera 100 is the same as explained in FIG. 1, and an explanation will be omitted.

Figure 11:
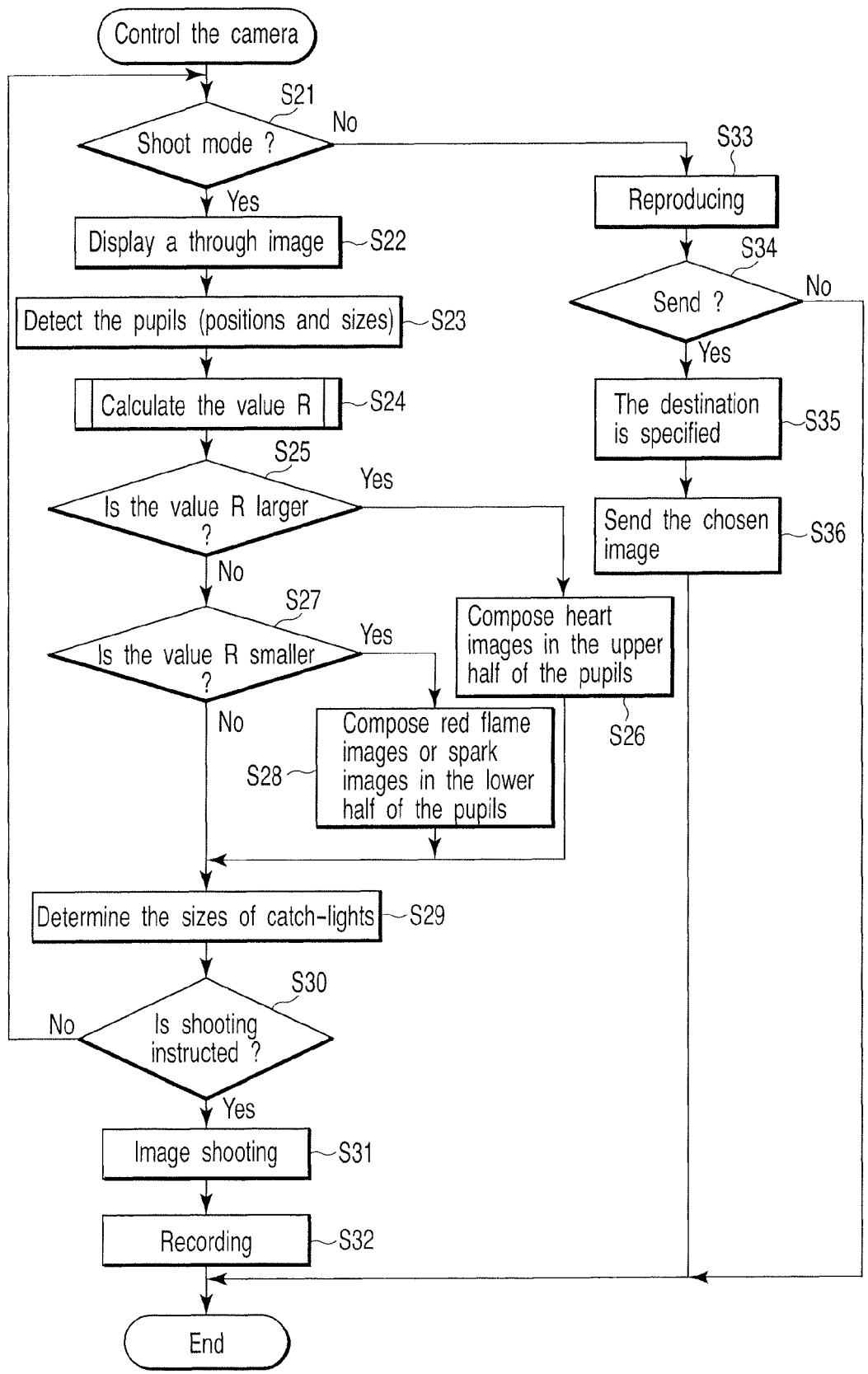
FIG. 11 is a flowchart showing the operation of a digital camera according to a second embodiment of the invention.

FIG. 11 is a flow chart showing the operation of the digital camera 100 in the second embodiment of the invention.

In FIG. 11, the MPU 101 judges whether the operation mode of the digital camera 100 is shoot mode (step S21). When the operation mode is judged to be shoot mode in step S21, the MPU 101 executes various controls for displaying a through image for framing on the display panel 111 (step S22). Then, the MPU 101 detects the position and size of pupils by using the technique as explained in the processing of step S5 in FIG. 4 (step S23).

The MPU 101 calculates the value R by the face expression detection circuit 114 for detecting the face expression of the subject 200 in a through image. After calculating the value R, the MPU 101 judges whether the calculated value R is higher than a first predetermined value (step S25). When the value R is judged higher than the first predetermined value in of step S25, the MPU 101 composes pink heart-shaped catch-light images or yellow star-shaped catch-light images in the upper half parts of the pupils in the image data obtained through the image pickup element 107 by using the image processing circuit 109 (step S26). Whether heart-shaped catch-lights or star-shaped catch-lights are composed should be previously set. When the value R is judged lower than the first predetermined value in step S25, the MPU 101 judges whether the calculated value R is smaller than the second value that is smaller than the first predetermined value (step S27). When the value R is judged lower than the second predetermined value in step S27, the MPU 101 composes red flame-shaped catch-light images or yellow spark-shaped catch-light images in the lower half parts of pupils in the image data obtained through the image pickup element 107, by using the image processing circuit 109 (step S28). Whether catch-light images are flame-shaped or spark-shaped should be previously set.

After composing catch-light images in step S26 or step S28, the MPU 101 adjusts the size of the composed catch-light images according to the colors of the catch-light images, by using the image processing circuit 109 (step S29). This prevents assimilation of catch-light images and the whites of eyes. Therefore, when catch-light images to be composed are white or of light colors, the sizes of composed catch-light images are compressed so as not to project from the pupils. When catch-light images to be composed are heavy colors, the sizes of catch-light images are not adjusted. The sizes of catch-light images may be adjusted according to the shapes of catch-light images to be composed. For example, when heart-shaped or star-shaped catch-light images are composed, the images may be compressed to stay within the pupils. When flame-shaped or spark-shaped catch-light images are composed, the sizes of the images need not be adjusted.

After step S29, the MPU 101 judges whether the photographer instructs photo shooting by operating the operating unit 102 (step S30). When photo shooting is not instructed in the judgment of step S30, the process returns to step S21. In contrast, when photo shooting is instructed in the judgment of step S30, the MPU 101 executes the photo shooting operation (step S31). Then, the MPU 101 records the image data obtained by photo shooting on the recording medium 117 (step S32), and finishes the processing of FIG. 11.

When the operation mode is judged not to be the shoot mode in step S21, the MPU 101 judges the mode to be play mode, and waits for the choice of an image by the photographer. When an image is chosen, the MPU 101 reads the image data corresponding to the chosen image from the recording medium 117, and reproduces such image on the display panel 111 (step S33). Then, the MPU 101 judges whether the photographer operates to send the chosen image data (step S34). When the photographer does not operate to send the chosen image data in step S34, the MPU 101 finishes the processing of FIG. 11. In contrast, when the photographer operates to send the image data in step S34, the MPU 101 waits for input of the destination of the image data by the photographer (step S35). When the destination of the image is input, the MPU 101 sends the image data being played at that time to the destination specified in step S35, by using the communication circuit 120 (step S36), and finishes the processing of FIG. 11.

As explained above, according to the second embodiment, it is possible to perform photo shooting while confirming an image with composed catch-light images by visual inspection, when a through image is displayed before photo shooting. It is also possible to compose catch-light images that better reinforces a face expression by adjusting the sizes of catch-light images according to the colors and shapes of catch-light images to be composed.

In the embodiments described herein, for simplicity of description, a face expression of the subject 200 is judged based on the value R obtained by adding RE that is the value R concerning eyes and RL that is the value R concerning a mouth. However, it is possible to judge a face expression of the subject 200 by individually evaluating RE and RL, or individually judging the expressions of eyes and mouth.

Further, in the embodiments described herein, a heart, star and flame are given as examples of the shapes of catch-light images to be composed in the pupils. However, the shapes of catch-light images are not limited to them. For example, it is possible to compose catch-light images in the same shape (white circular) as the reflected light shown in FIG. 3A. When different shapes of catch-light images are added, it is necessary to previously set a range of the value R corresponding to such catch-light images.

It is also possible to display the result of composition after composing catch-lights, and to enable the photographer to edit the composed catch-light images by operating the operating unit 102. It is also possible to edit such catch-light images in play mode.

It is not necessary to use the digital camera 100 for composing catch-light images according to the face expression of the subject 200. For example, catch-light images may be composed according to software installed in a personal computer (PC).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image editing apparatus comprising:
   an image input unit including an image pickup circuit which takes a picture of a subject to obtain an image of the subject;
   a face detection circuit which detects an image of a face of the subject from the image obtained from the image input unit;
   a face expression detection circuit which detects a value indicating the extent of a smiling face of the subject as a face expression of the subject, based, at least in part, on (1) the image of the face detected by the face detection circuit, and (2) a sum of a normalized value of a whites of eyes area in the image of the face and a normalized value of a lips area in the image of the face;
   a pupil detection circuit which detects images of pupils of the subject, based on the image of the face detected by the face detection circuit; and
   a catch-light composition circuit which composes catch-lights of different shapes and colors on the images of the pupils detected by the pupil detection circuit, according to the value indicating the extent of a smiling face of the subject detected by the face expression detection circuit, the catch-lights emphasizing the face expression, wherein the face expression detection circuit further determines if both (1) teeth are visible in the image of the face and (2) an end of mouth is shaded in the image of the face, and responsive to a determination that both (1) the teeth are visible and (2) the end of the mouth is shaded, increments the value by a predetermined amount, otherwise, decrements the value by the predetermined amount.

2. The image editing apparatus according to claim 1, wherein the pupil detection circuit detects catch-lights in the images of the pupils, and the catch-light composition circuit eliminates the catch-lights from the images of the pupils.

3. The image editing apparatus according to claim 2, wherein the catch-light composition circuit composes the catch-lights after reducing the sizes to fit within the pupils.

4. The image editing apparatus according to claim 3, wherein the catch-light composition circuit composes the catch-lights in the upper parts of the images of the pupils when the face has wide opened eyes, and composes the catch-lights in the lower parts of the images of the pupils when the face has staring eyes.

5. A method of controlling an apparatus for editing an image obtained by taking a picture of a subject, the method comprising:

detecting an image of a face of the subject from the obtained image;

detecting a value indicating the extent of a smiling face of the subject as a face expression of the subject, based, at least in part, on (1) the detected image of the face, and (2) a sum of a normalized value of a whites of eyes area in the image of the face and a normalized value of a lips area in the image of the face;

detecting images of pupils of the subject, based on the detected image of the face;

composing catch-lights of different shapes and colors on the detected images of the pupils, according to the value indicating the extent of a smiling face of the subject, the catch-lights emphasizing the face expression;

determining if both (1) teeth are visible in the image of the face and (2) an end of mouth is shaded in the image of the face; and responsive to a determination that both (1) the teeth are visible and (2) the end of the mouth is shaded, incrementing the value by a predetermined amount, otherwise, decrementing the value by the predetermined amount.

6. The control method according to claim 5, wherein the act of detecting the images of the pupils includes detecting catch-lights in the images of the pupils, and the act of composing catch-lights includes eliminating the catch-lights from the images of the pupils.

7. The control method according to claim 6, wherein the composing catch-lights includes composing the catch-lights after reducing the sizes to fit within the pupils.

8. The control method according to claim 7, wherein the act of composing catch-lights includes composing the catch-lights in the upper parts of the images of the pupils when the face has wide opened eyes, and composing the catch-lights in the lower parts of the images of the pupils when the face has staring eyes.

9. An image editing apparatus comprising:

an image input unit including an image pickup circuit which takes a picture of a subject to obtain an image of the subject;

a face detection circuit which detects an image of a face of the subject from the image obtained from the image input unit;

a face expression detection circuit which detects a value indicating the extent of a smiling face of the subject as a face expression of the subject, based on the image of the face detected by the face detection circuit, wherein the face expression detection circuit detects the value by determining a sum of a normalized value of a whites of eyes area in the image of the face and a normalized value of a lips area in the image of the face, determining if both (1) teeth are visible in the image of the face and (2) an end of mouth is shaded in the image of the face, and responsive to a determination that both (1) the teeth are visible and (2) the end of the mouth is shaded, incrementing the value by a predetermined amount, otherwise, decrementing the value by the predetermined amount;

a pupil detection circuit which detects images of pupils of the subject, based on the image of the face detected by the face detection circuit; and a catch-light composition circuit which composes catch-lights of different shapes and colors on the images of the pupils detected by the pupil detection circuit, according to the value indicating the extent of a smiling face of the subject detected by the face expression detection circuit.

* * * * *